(12) United States Patent
Legg

(10) Patent No.: US 7,511,454 B1
(45) Date of Patent: *Mar. 31, 2009

(54) BATTERY LABEL WITH WIRELESS BATTERY CHARGING CIRCUIT

(75) Inventor: Stephen Peter Legg, Southampton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/194,400

(22) Filed: Aug. 19, 2008

Related U.S. Application Data

(63) Continuation of application No. 12/107,939, filed on Apr. 23, 2008, now Pat. No. 7,456,606.

(51) Int. Cl.
*H02J 7/00* (2006.01)
*H01Q 11/12* (2006.01)
*H04B 1/16* (2006.01)
*H04B 1/38* (2006.01)

(52) U.S. Cl. ............... 320/108; 455/127.1; 455/343.1; 455/573

(58) Field of Classification Search ............... 320/108; 455/127.1, 343.1, 573
See application file for complete search history.

(56) References Cited

U.S. PATENT DOCUMENTS

| 7,180,265 B2 | 2/2007 | Naskali et al. |
| 7,268,517 B2 | 9/2007 | Rahmel et al. |
| 2006/0043927 A1 | 3/2006 | Beart et al. |

*Primary Examiner*—Akm E Ullah
*Assistant Examiner*—Richard V Muralidar
(74) *Attorney, Agent, or Firm*—The Law Firm of Andrea Hence Evans, LLC

(57) ABSTRACT

This invention relates to an apparatus and method for making a battery charging unit using induction to eliminate the requirement to constantly remove rechargeable batteries from their particular units in order to recharge them. This invention further relates to an apparatus and method using induction to eliminate the requirement to electrically or mechanically connect the charged device to a battery charging unit in order to recharge the battery.

1 Claim, 5 Drawing Sheets

BATTERY LABEL WITH WIRELESS BATTERY CHARGING CIRCUIT

RELATED APPLICATIONS

The present application is a continuation of prior U.S. application Ser. No. 12/107,939, filed Apr. 23, 2008, the entirety of which is incorporated herein by reference.

FIELD OF THE INVENTION

The present invention relates to solid state technologies and more particularly to a charging circuit (i.e. power transmitter circuit) that uses induction to provide power transfer between a power transmitter such as a charging base and a power receiving device (i.e. eliminating the use of wires). Relevant potential applications for the present invention include any small portable hand-held device that uses standard sized batteries, but not limited to, calculators, cameras, mp3 players, CD players, GPS units, hand-held electronic instruments, hand-held medical instruments etc., or any device that requires batteries to be taken out for replacement or for recharging.

BACKGROUND OF THE INVENTION

Many hand-held devices use either non-rechargeable (primary) or rechargeable (secondary) cells for drawing power. Common cell sizes are AAA, AA, C, D, and the like. Using rechargeable cells is a preferable on-going cost savings option for the user and provides a positive environmental impact. However, one drawback of using rechargeable batteries is the constant requirement placed on the user to periodically remove the cells and place them in a charger, or to plug in a specific cell charger to the particular device used.

"Trickle charging" in the context of rechargeable batteries is well-known in the art as charging a battery at a rate close to its self-discharge rate. All rechargeable batteries slowly discharge themselves over a period of perhaps many hundreds of hours. "Trickle charging" keeps a battery 'topped up'. If a battery has a capacity C, then it may perhaps be allowed to be charged at a rate C/8 which means that it reaches full charge in 8 hours. That would be a typical charge rate. "Trickle charging" would be at a rate of perhaps C/100 (or lower (i.e. to charge it from fully discharged at the trickle rate it would take 100 hours or more).

Wireless recharging of batteries is a known technology, used widely, for example, in battery operated electric toothbrushes. In these the toothbrush is rested on a recharging base when not in use, the base containing the primary coil of a transformer. The secondary coil of the transformer is in the handle of the toothbrush. Power is coupled magnetically to charge the cells in the toothbrush. This is a very purpose specific application as it operates with a closely coupled transformer at relatively low frequency.

Wireless recharging where the power receiving circuit is custom built into the hand-held device is also known. Splashpower® is one vendor offering such wireless recharging capability.

Beart et al. disclose, in U.S. publication no. 2006/0043927 A1, issued Mar. 2, 2006, a system and method for retaining portable rechargeable devices to recharging stations wherein one or other or both of the recharging station and the portable device are provided with connecting means adapted for temporary releasable connection of the two.

More specifically, Beart et al. disclose a mobile phone that has a connecting means attached to the back of the mobile phone. Beart et al. discloses that the connecting means is a patch of self-adhesive Velcro®. Further, Baert et al. discloses that the connection means can be in the form of suckers, reusable self-adhesive glue, or other forms of high "stiction/friction" surfaces.

The adhesive layer discloses by Beart et al. is on the outside of a wireless device's casing.

Naskali et al. disclose in U.S. Pat. No. 7,180,265 B2, issued Feb. 20, 2007, an apparatus and method for a charging device which includes a battery having a first induction coil coupled to the battery, and an induction core extending through the first induction coil. The induction core has a portion which extends in an outward direction from the charging device and is adapted to removably couple with a second induction coil of a portable electronic device by extending into the second induction coil.

Rahmel et al. disclose in U.S. Pat. No. 7,268,517 B2, issued Sep. 11, 2007, a system for harvesting radio frequency energy from the atmosphere and redirecting the energy to wirelessly power electrical devices. More specifically Rahmel discloses an energy harvesting subsystem (EHS) which pulls free RF energy out of the atmosphere and redirects the energy using energy conversion subsystem (ECS). The ECS rectifies energy to convert it and send it to a transformer and a trickle charger. The transformer and the trickle charger are designed to match impedances to prevent undesired energy loss between the two elements. The trickle charger delivers the energy to the rechargeable battery for storage to be used later by stand-by devices.

Despite these and other efforts in the art, still further improvements in the area of wireless power supply which requires no electrical or mechanical connection between the power transmitter and the power receiver would be desirable.

SUMMARY OF THE INVENTION

The present invention provides an apparatus and method to allow batteries that use this invention to be inductively charged or re-charged while allowing the batteries to remain situated within their power receiving device. The present invention further eliminates the requirement for power transmitter to be electrically or mechanically connected to the power receiving device. The batteries of the present invention are subject to a wireless charging capability provided by an apparatus and method well known in the art and described herein, utilizing another well-known technology to signal charging completion. Such wireless-charged batteries would remain inside power receiving device, and by being placed in the induced field of power transmitter (i.e. a charging unit), would couple energy from the power transmitter.

The present invention describes a generally applicable means to permit the user to keep the cells charged at a trickle charge rate without the need to remove the cells for recharging or to plug the secondary cell power receiving device into a cell charger.

Further, the present invention extends the concept of wireless recharging at a trickle charge rate to general purpose rechargeable batteries.

The present invention is differentiated from the technique in common use in electric toothbrushes which use a relatively large mutual inductance afforded by the physical arrangement of the primary and secondary coils. By arranging the primary coil and secondary coil to operate at much higher frequency (e.g. of the order of 1 MHz), and by adding a capacitor to make these inductors resonant at that frequency, the primary coil and secondary coil can be made much smaller, and with fewer turns.

An aspect of an embodiment of the present invention comprises a modified version of a standard AA (or other sized) battery.

A further aspect of an embodiment of the present invention is to provide a cost effective and long-awaited apparatus and method for making a wireless battery charging unit wherein the apparatus and method solution uses induction to eliminate the requirement to constantly remove rechargeable batteries from their particular units in order to recharge them.

A further aspect of an embodiment of the present invention is to provide a cost-effective and long-waited apparatus and method wherein the apparatus and method solution uses induction to eliminate the requirement to electrically or mechanically connect the power receiving device to a power transmitter (i.e. battery charging unit) in order to recharge the battery.

A further aspect of an embodiment the present invention avoids using a large mutual inductance, but instead uses coils of lower inductance by using a capacitor in parallel in the receiver and in series in the transmitter, though resonance capabilities of the present invention is not limited to these design features.

Additional aspects, objectives, features and aims of the present invention will become apparent from the following description of the preferred embodiments with reference to the attached drawings.

DETAILED DESCRIPTION OF THE INVENTION

Figure 1:
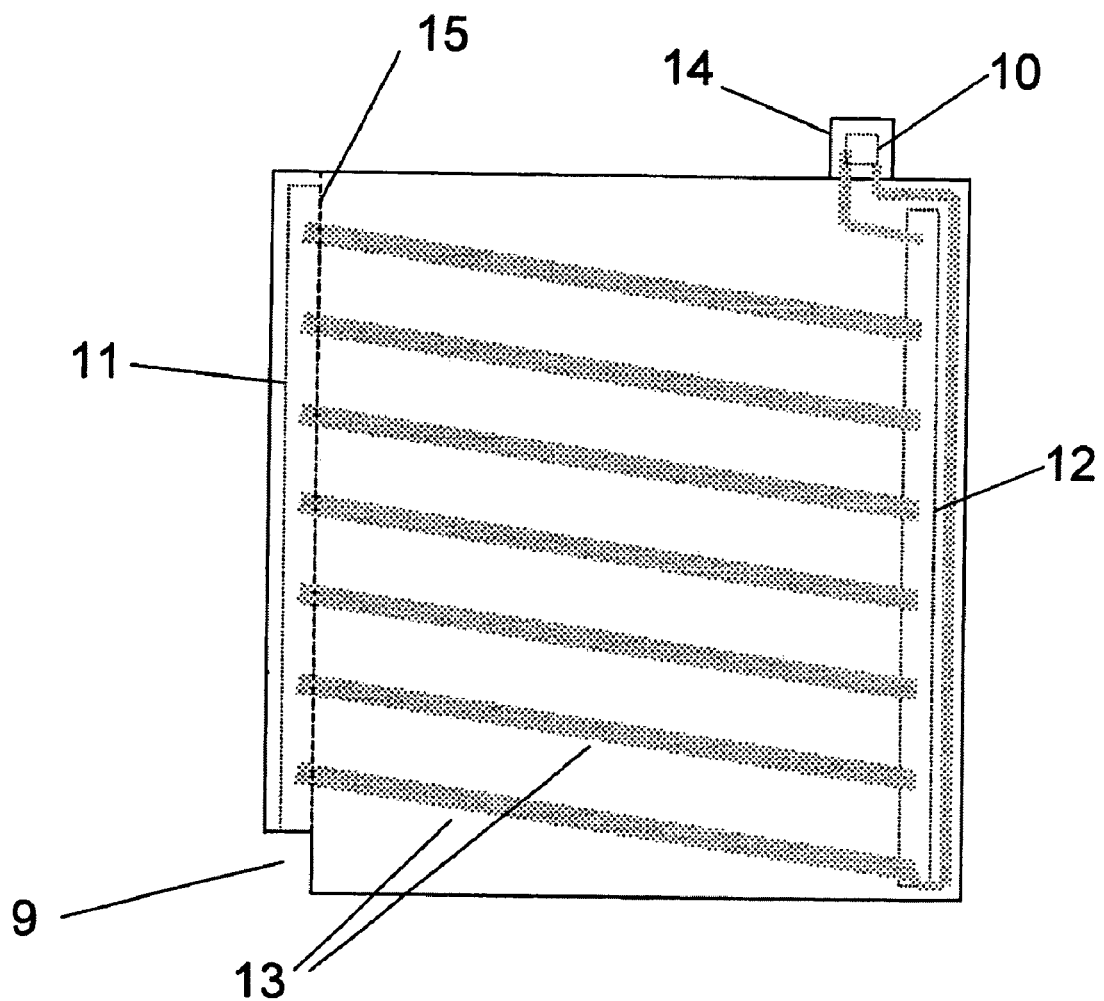
FIG. 1 illustrates a side view of a rechargeable battery, in accordance with the embodiments of the present invention.

An embodiment of the present invention comprises a modified version of a standard AA (or other sized) battery. In this embodiment of the present invention, the reverse side of the label on the rechargeable cell is printed with a pattern of lines using conductive ink. Conductive inks are well-known. The pattern on the self adhesive label is shown at FIG. 1. Dimensions shown in FIG. 1 are for an "AA" sized battery which is typically 14 mm in diameter and 48 mm high. However, additional sized batteries may be used and the size of the adhesive label would be adjusted accordingly. The conductive ink pattern is overlaid with an insulating layer, then with the pressure sensitive adhesive that holds the label onto the cell once assembled. Three apertures 10, 11 and 12 are provided in the insulating layer and the adhesive layer.

Figure 2:
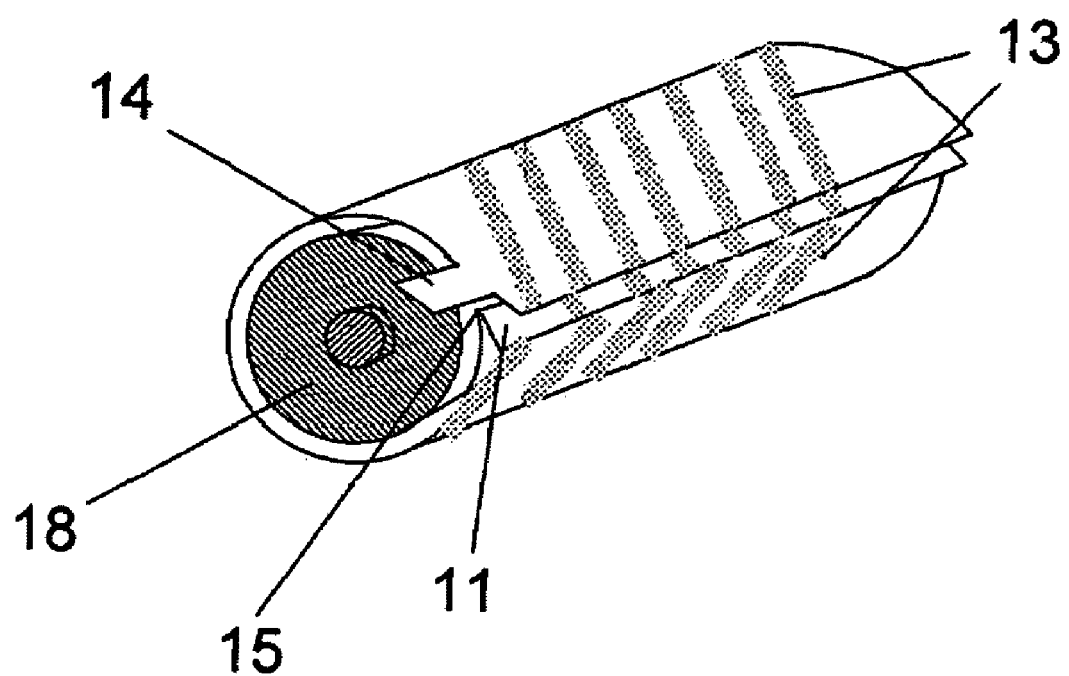
FIG. 2 illustrates a rechargeable battery in accordance with the embodiments of the present invention.
Figure 3:
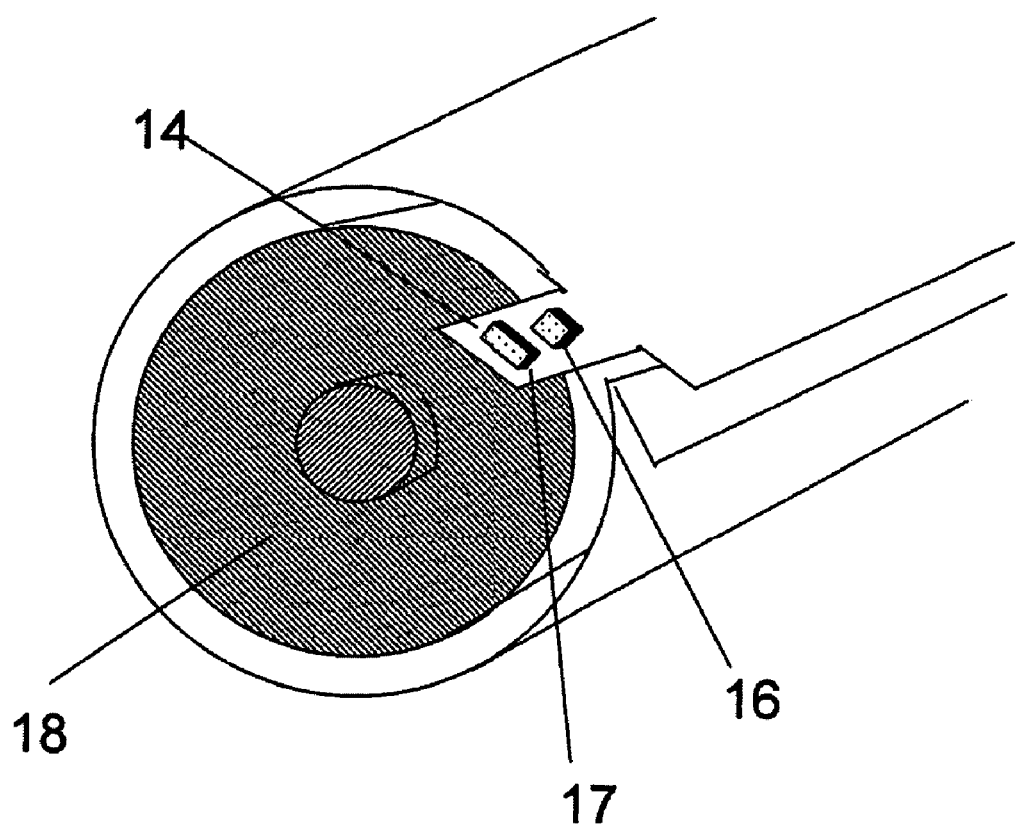
FIG. 3 illustrates a top and side portion of a rechargeable battery in accordance with the embodiments of the present invention.

The label, as shown in FIGS. 1, 2, and 3 comprises four layers, and is made from a material that is well-known to one of ordinary skill in the art. The label comprises a first base layer of insulating material, which will provide the outer sheath for the battery when assembled. Next a pattern is printed in a second layer of conductive ink, shown as elements 13 in FIG. 1. A third layer of insulating material is laminated over the second layer and has apertures 11 and 12 cut in it to expose said conductive ink elements. This top insulating layer is coated with a forth layer which is a pressure sensitive adhesive to hold the label onto the battery, and to fix together the overlap of the label where aperture 11 (folded back at fold line 15) is brought into opposition to aperture 12, as shown in FIG. 1.

The label is rolled onto the cell, so that the diagonal conductors 13 make contact at the overlap through aperture 12 in the insulating layer. The edge with aperture 11 is folded back along line 15 to present the conductive ink lines in opposition to those exposed through aperture 12. This design technique results in a coil of conductive ink 'wiring' round the cell, with the two ends of the coil brought to the top of the cell at tab 14.

Figure 4:
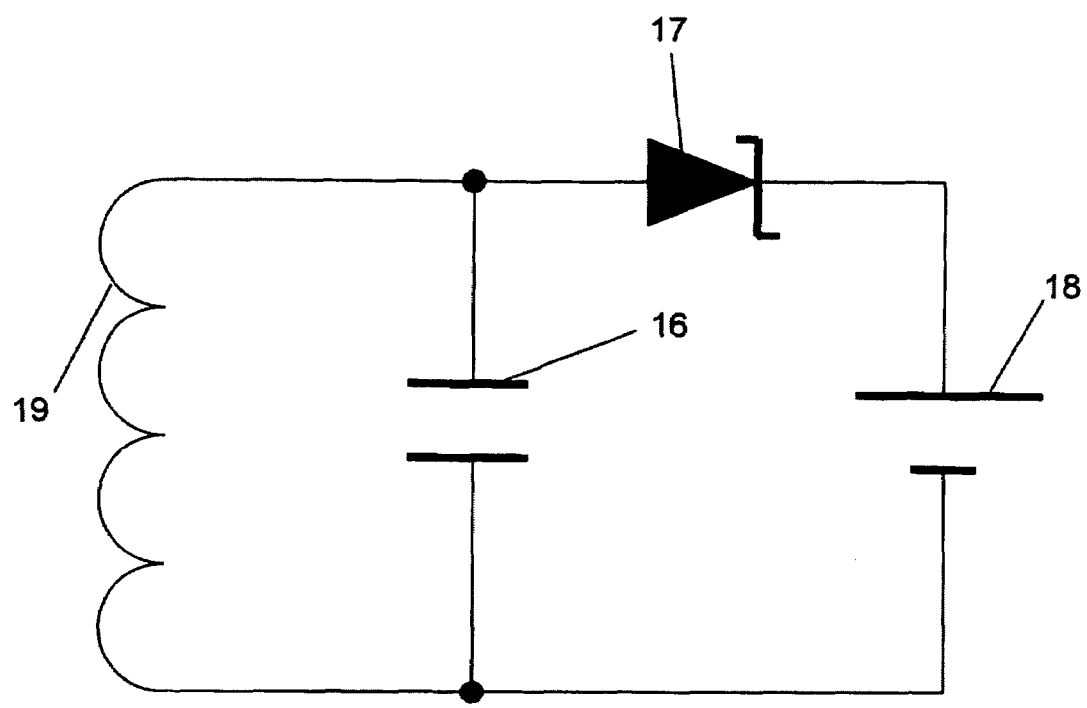
FIG. 4 illustrates a power receiving and rectification circuit that inductively receives power from the transmitter illustrated in FIG. 5 in accordance with the embodiments of the present invention.

The significance of the aforementioned design technique is that in arranging the conductive ink pattern and the apertures described, the action of rolling the label onto the cell (which is a typical part of the manufacturing process for such a cell) results in the creation of a coil of conductive ink round the cell, said coil being the receiver of charging power as shown in FIG. 4. Clearly, a similar result may be achieved by winding a coil of insulated wire round the cell. However, a design technique winding a coil of insulated wire would be an expensive operation and not achievable with current battery manufacturing equipment. Making a coil using conductive inks patterns, apertures, and labels in the way described in the present invention may be achieved with current battery labeling equipment.

As shown in FIG. 3, assembled on tab 14 are a small capacitor 16 chosen to make the coil resonant at the desired frequency, and a Schottky diode 17 to rectify the voltage induced in the resonant coil. The output voltage from the rectified coil is connected to the cell through the apertures 10 and 12 (shown in FIG. 1) onto the metal casing of the cell at the positive top part of the cell and negative bottom part of the cell.

Figure 5:
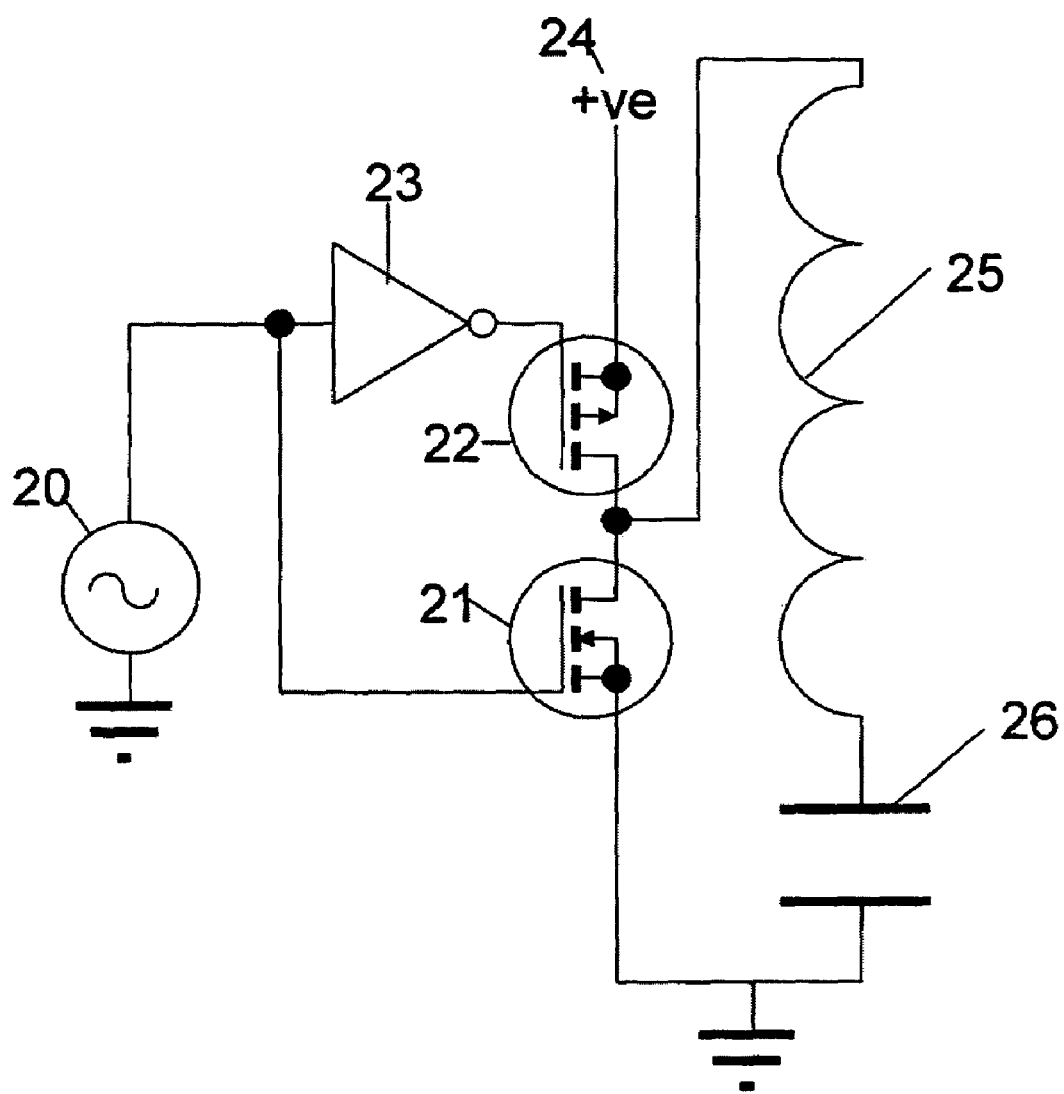
FIG. 5 illustrates a power transmission circuit that transmits power to the circuit illustrated in FIG. 4 which is coupled inductively to it in accordance with the embodiments of the present invention.

In another embodiment of the present invention, FIG. 4 illustrates a power receiving and rectification circuit that inductively receives power from the transmitter in FIG. 5 (described herein), then rectifies it by means of the Schottky diode and uses the resultant d.c. current to charge the cell. More specifically, the circuit shown in FIG. 4 comprises a receiving coil 19 and a parallel capacitor 16 which the capacitor's value is chosen to make the parallel circuit resonate at the frequency of the power transmission circuit shown in FIG. 5. In this regard, the receiver is made more efficient by arranging it to be resonant at the frequency of the transmitter. Thus, when the receiving circuit (embodied on the label of the battery) is in close proximity to the transmitting circuit of FIG. 5, an alternating voltage will be induced in the coil 19. This voltage is rectified by the Schottky diode 17 to provide a charging voltage for the cell 18. A Schottky diode is chosen in the preferred embodiment (though not essential to carrying out the present invention) since it has a lower forward voltage drop than other types of diodes so it will be more efficient at permitting charging current to flow.

In another embodiment of the invention, FIG. 5 illustrates an example of a power transmission circuit that transmits power to the circuit in FIG. 4 (described herein) and which is coupled inductively to the circuit in FIG. 4 (i.e. FIG. 5 is the circuit for the device that performs the charging of the batteries). More specifically, FIG. 5 illustrates a driving circuit comprising elements 20, 21, 22 and 23, such that oscillator 20 drives a pair of transistors 21 and 22 in anti-phase by the use of a phase inverter 23 and a series resonant tuned circuit comprising inductor 25 and capacitor 26. These elements are all powered by a d.c. power source 24 which is applied such that power source 24 is supplied to the driver transistors at the common point of which drives the series resonant transmitter circuit comprising inductor coil 25 and capacitor 26.

In another embodiment of the present invention, the inductor 25 may comprise a small number of circular turns of sufficient diameter to allow them to cover an area of approximately 18 to 20 square inches (i.e. a coil of a diameter for example between 4 and 5 inches). This design manifests itself as a suitably flat coil, and could easily be molded into a mat or into the base of a tray made of insulating material. Devices containing wireless rechargeable batteries to be charged could be placed onto the mat or into the base of a tray allowing energy would flow from the charging circuit to the wireless battery charged circuit by electromagnetic induction.

In operation, the wireless charging circuit may be built into a mat or the base of a tray, and hand-held devices with wireless rechargeable batteries in them may be placed on the mat or tray when they are not in use. While the charged devices are in close proximity to the wireless recharging circuit, the cells will be trickle charged.

The apparatus and method of this invention has been described with respect to individual charged devices. However, it is contemplated that the apparatus and method of wireless charging may be employed with a plurality of charged devices per wireless charging circuit.

While particular embodiments of the present invention have been described herein for the purposes of illustration, many modifications and changes will become apparent to those skilled in the art. Accordingly, the appended claims are intended to encompass all such modifications and changes as fall within the true spirit and scope of this invention.

The invention claimed is:

1. A wireless battery charging unit comprising:

a power receiving and rectification circuit arranged on a label wherein the label is disposed on a battery;

the label with a first insulating base layer arranged on the battery;

a patterned layer of conductive ink printed on the first insulating base layer;

a second insulating layer having apertures laminated onto the printed patterned layer of conductive ink to expose said printed pattern of conductive ink;

said second insulating layer coated with a pressure sensitive adhesive layer for holding the label onto the battery;

the power receiving and rectification circuit inductively receiving power from a power transmitting circuit through an inductive coupling; and the inductive coupling communicating inductively with the printed pattern of conductive ink exposed through the apertures in order to transmit power to charge the battery.

* * * * *